(12) United States Patent
Arihara et al.

(10) Patent No.: US 8,734,626 B2
(45) Date of Patent: May 27, 2014

(54) ELECTRODE, OZONE GENERATOR, AND OZONE PRODUCTION METHOD

(75) Inventors: Kazuki Arihara, Nagoya (JP); Akira Fujishima, Nagoya (JP)

(73) Assignee: Central Japan Railway Company, Nagoya-Shi (JP)

( * ) Notice: Subject to any disclaimer, the term of this patent is extended or adjusted under 35 U.S.C. 154(b) by 1891 days.

(21) Appl. No.: 11/587,936

(22) PCT Filed: Apr. 28, 2005

(86) PCT No.: PCT/JP2005/008216
§ 371 (c)(1),
(2), (4) Date: Sep. 4, 2007

(87) PCT Pub. No.: WO2005/106079
PCT Pub. Date: Nov. 10, 2005

(65) Prior Publication Data
US 2008/0053840 A1 Mar. 6, 2008

(30) Foreign Application Priority Data

Apr. 28, 2004 (JP) .................. 2004-133930
Mar. 31, 2005 (JP) .................. 2005-104334

(51) Int. Cl.
*C25B 11/03* (2006.01)
*C25B 1/13* (2006.01)
(52) U.S. Cl.
CPC .. *C25B 11/03* (2013.01); *C25B 1/13* (2013.01)
USPC ............................ 204/284; 204/283; 206/626
(58) Field of Classification Search
CPC .................................. C25B 1/13; C25B 11/03
USPC .................................. 204/283, 284; 205/626
See application file for complete search history.

(56) References Cited

U.S. PATENT DOCUMENTS 4,629,373 A * 12/1986 Hall .............................. 407/118
5,399,247 A 3/1995 Carey et al.
(Continued)

FOREIGN PATENT DOCUMENTS

DE 10025167 A1 * 12/2001
JP 6-316406 11/1994
(Continued)

OTHER PUBLICATIONS

Office Action dated Apr. 8, 2008, issued in the corresponding Japanese patent application No. 2005-104334 and a partial English translation thereof.

(Continued)

*Primary Examiner* — Nicholas A Smith
(74) *Attorney, Agent, or Firm* — Edwards Wildman Palmer LLP; James E. Armstrong, IV; Nicholas J. DiCeglie, Jr.

(57) ABSTRACT

An anode (3) and a cathode (5), interposing a solid polymer film (7), are disposed. While supplying purified water from a supply port (13a) of an anode chamber (13), wherein the anode (3) is disposed, and a supply port (15a) of a cathode chamber (15), wherein the cathode (5) is disposed, direct electric current is applied between the anode (3) and the cathode (5). As a result, ozone-water is discharged from an outlet port (13b) of the anode chamber (13). In such an electrolysis cell (1), a free-standing conductive diamond plate, formed by microwave plasma assisted CVD so as to have a thickness of 0.8 mm, is used as the anode (3). The diamond plate is provided with holes, having a diameter of 1 mm and disposed such that a center distance therebetween becomes 2 mm. Therefore, the electrolysis cell (1) can stably produce ozone without causing exfoliation of the anode (3), even when high voltage and large current are applied between the anode (3) and the cathode (5).

16 Claims, 5 Drawing Sheets

(56) References Cited

U.S. PATENT DOCUMENTS

| | | | |
|---|---|---|---|
| 6,746,580 B2 * | 6/2004 | Andrews et al. | 204/253 |
| 2002/0031913 A1 * | 3/2002 | Nishibayashi et al. | 438/689 |
| 2004/0011643 A1 * | 1/2004 | Davies et al. | 204/294 |

FOREIGN PATENT DOCUMENTS

| | | |
|---|---|---|
| JP | 07299467 | 11/1995 |
| JP | 9-268395 | 10/1997 |
| JP | 2000-031638 | 1/2000 |
| JP | 2001-192874 | 7/2001 |
| JP | 2003-062683 | 3/2003 |
| JP | 2003-236545 | 8/2003 |
| JP | 2003-236552 | 8/2003 |
| JP | 2003-275889 | 9/2003 |
| WO | WO-03/066930 | 8/2003 |

OTHER PUBLICATIONS

Japanese Office Action issued Jul. 9, 2008 in JP 2005-104334.
A. Yada, et al.; "Synthesis of high quality diamond by plasma enhanced CVD methods;" *The Japan Society of Plasma Science and Nuclear Fusion Research*; vol. 76; No. 9; 2000; pp. 833-841 and Cover Sheet (10 Sheets total.).
H. Sugimtisu; "Basics and Applications of Ozone;" *Korin*; Feb. 1996; pp. 108-129 and Cover Sheet (12 Sheets total.)/Discussed in the specification.

\* cited by examiner

ELECTRODE, OZONE GENERATOR, AND OZONE PRODUCTION METHOD

TECHNICAL FIELD

This invention relates to an electrode, an ozone generator, and an ozone production method. Specifically, the present invention relates to an ozone generator and an ozone production method, wherein a cathode and an anode are provided so as to interpose a solid polymer film, and to produce ozone by electrolyzing water. The present invention also relates to an electrode which can be suitably adopted for such ozone generator and the ozone production method.

BACKGROUND ART

Ozone is a very strong oxidant. Disinfection property, discoloration effect, and deodorization effect which derive from the oxidizing ability are applied in various fields. A disinfection method and a discoloration method utilizing ozone can be processing methods in which secondary pollution does not have to be concerned, because ozone can be readily decomposed into oxygen spontaneously. Ozone, dissolved in water, increases the oxidizing ability, and is generally used for disinfection and the like. For these purposes, developing a production method is required wherein ozone gas or ozone-water can be more easily and more effectively produced.

As for a method to produce gaseous ozone, UV lamp method, silent discharge method, and electrolysis method are known (for example, see Non-patent Document 1). The UV lamp method, wherein a small amount of ozone is produced, is usually used for removing a small amount of odor, such as for deodorizing a room or a car. The silent discharge method is a general method for producing ozone gas. However, when atmospheric air is used as the ingredient, nitrogen oxide is simultaneously produced. In order to prevent this, oxygen gas should be used as the ingredient, or an attachment device, which concentrates only oxygen in atmospheric air, should be equipped. Moreover, impurity incorporation also becomes a problem wherein metal impurity gets mixed in ozone gas due to a metal electrode being worn away. In contrast, ozone gas can be obtained by water electrolysis. Although the ozone gas obtained by the electrolysis method contains moisture, ozone gas with high purity and high concentration can be easily obtained.

As for a method to obtain ozone-water, some methods are known wherein ozone gas, obtained by the above-described methods, is dissolved in water, or wherein ozone-water is produced directly by the electrolysis method. Ozone-water could be obtained by running ozone gas, produced according to the silent discharge method or the electrolysis method, through a vapor-liquid dissolution tower and dissolving the ozone gas in water. However, a device for this kind of method would become large and complicated. On the other hand, according to the electrolysis method, wherein an electrolysis cell is constituted with a porous or mesh anode and a porous or mesh cathode interposing a solid polymer film therebetween, and the cell is used so as to electrolyze tap water or purified water, ozone-water can be directly produced. Moreover, a device for this kind of method can be easily small.

The materials used for an electrode for producing ozone gas or ozone-water by the electrolysis method, are generally lead dioxide and platinum, because of their prominent catalytic functions. These materials are formed into a porous or mesh anode 3, and used together with a suitable cathode 5 interposing a solid polymer film 7 therebetween. As a result, an electrolysis cell 1, shown, for example, in FIG. 1, is constituted. Ozone gas or ozone-water can be obtained by supplying purified water or tap water in an anode chamber 13 of the electrolysis cell 1 (see, for example, Patent Documents 1 and 2).

However, in a case, such as in Patent Documents 1 and 2, wherein lead dioxide and platinum are used for the electrode, a problem has been pointed out that the electrode gets worn away and dissolved, as the electrode is used in electrolysis for producing ozone. Particularly, when lead dioxide is used for the electrode, there is a possibility that lead gets mixed into ozone-water even in minute amount. Therefore, use of the ozone-water directly produced by the electrolysis is not preferable. Instead, some methods are used so as to process the ozone-water, obtained by the electrolysis, by separating ozone by using a vapor-liquid separator so as to obtain ozone gas, and furthermore by running the obtained ozone gas through a gas dissolution tower and dissolving the ozone gas into water so as to obtain ozone-water. As a result, an ozone generator tends to become large in size, complicated, and expensive. Moreover, since the state of lead dioxide is easily changed and the ability to produce ozone tends to be decreased, prevention is required by constantly applying voltage on an anode for anodic polarization. Therefore, an ozone generator needs to be equipped with an extra power supply for in case of emergency. An ozone generator still becomes large, complicated, and expensive.

Platinum is used as a relatively stable material for an electrode. However, the fact is known that platinum gradually gets worn away and dissolved in electrolysis wherein large electric current and high voltage is applied. Therefore, a platinum electrode needs to be regularly replaced. Moreover, platinum is rare noble metal and expensive. This fact becomes an obstacle for using platinum for an electrode.

Recently, a diamond film with electric conductivity is suggested as a material for an electrode in place of the above-described materials. The principal characteristics of the conductive diamond film include unique characteristics which cannot be seen in other materials for an electrode: for example, the conductive diamond film has high mechanical strength and high chemical inertness; molecules are not easily adsorbed to the diamond film, the diamond film exhibits a wide potential window in which oxidative decomposition and reductive decomposition of solvent do not easily occur; there is selectivity of the reaction, and so on. Therefore, producing ozone has been considered by using the diamond film. The diamond film is formed on a mesh or porous substrate by the hot-filament chemical vapor decomposition (CVD) or the microwave plasma assisted CVD. The diamond film is utilized as an anode in an electrolysis cell wherein the anode interposes a solid polymer film with a cathode (for example, see Patent Document 3).

Non-Patent Document 1: Sugimitsu, Hidetoshi (February 1996). Basics and Applications of Ozone: Korin Patent Document 1: Unexamined Japanese Patent Publication No. 1-139785

Patent Document 2: Unexamined Japanese Patent Publication No. 1-312092

Patent Document 3: Unexamined Japanese Patent Publication No. 9-268395

DISCLOSURE OF INVENTION

PROBLEM TO BE SOLVED BY THE INVENTION

However, in a case wherein electrolysis is performed by applying large electric current on a diamond film formed on the above-described substrate, the diamond film sometimes is removed from the substrate for the following reason. That is, for example, forming a diamond film in a uniform manner on a complicated substrate, such as mesh or porous substrate, is extremely difficult. Therefore, there are some portions of the substrate which cannot be covered by any means. For this reason, niobium, tantalum, titanium, and the like, which are highly resistant to corrosion, are used for the substrate. But preventing the substrate from being worn away and dissolved due to electrolysis is still difficult. When this phenomenon proceeds further, the diamond film is removed from the substrate. Although diamond itself exhibit high mechanical strength and high chemical resistance, this kind of problem occurs in a case wherein a conductive diamond film, formed on a substrate, is used in a exposure to large electric current or high voltage for a long period of time.

In consideration of the above-described problems, the purpose of the present invention is to provide an electrode which does not have a problem of deterioration or exfoliation, and is capable of stably performing electrolysis wherein high voltage and large electric current is applied. The purpose of the present invention is also to provide an ozone generator which includes such electrode, and a method to produce ozone.

Means of Solving Problem

To solve the above-described problems, an electrode according to the present invention is made of a free-standing conductive diamond plate having a porous or mesh structure. Since the electrode of the present invention configured as above is made of a free-standing conductive diamond plate, exfoliation and other problems do not have to be concerned and the prominent characteristics of the conductive diamond can be stably maintained even when electrolysis is performed wherein high voltage and large electric current is applied. In addition, since the electrode according to the present invention has a porous or mesh structure, electrolysis can be suitably performed even a solid polymer film (so-called ion-exchange membrane) is attached on the entire surface of the electrode.

The above-described conductive diamond plate may be manufactured by various methods. However, in a case wherein the above-described conductive diamond plate is manufactured by microwave plasma assisted CVD, the following effect is furthermore caused. That is, a conductive diamond plate, manufactured by the microwave plasma assisted CVD, has a high crystalline property, and therefore has a high mechanical strength and chemical inertness. As a result, in this case, the durability of the electrode is further improved.

Various methods can be conceived of in order to obtain the porous or the mesh structure. In a case wherein a free-standing conductive diamond plate is made porous or mesh by providing holes by laser processing or electrical discharge, the manufacturing can be easy, and the manufacturing cost can be reduced. Additionally, in this case, the shape and the disposition of the holes can be easily structured as planned. Therefore, fluctuation in the characteristics of the electrode can be inhibited, and process yield can be improved.

Furthermore, in this case, if the thickness of the above-described conductive diamond plate is 0.2-1.0 mm, the following effect is furthermore caused. When electric current is applied to an electrolysis cell made with this kind of anode, on the inner-wall surfaces of the above-described holes, oxygen evolution reaction or ozone evolution reaction take place due to oxidative decomposition of water.

$$2H_2O \rightarrow O_2 + 4H^+ + 4e^- \quad (1)$$

$$3H_2O \rightarrow O_3 + 6H^+ + 6e^- \quad (2)$$

Hydrogen ions produced through the reaction processes (1) and (2) permeate the solid polymer film, having ion-permeable property, and reach the cathode. On the cathode, reduction reaction takes place wherein the hydrogen ions, which permeate through the film, receive electrons, and the produced hydrogen is dispersed in a cathode chamber.

$$2H^+ + 2e^- \rightarrow H_2 \quad (3)$$

This sequence of steps takes place in ozone production process by means of electrolysis. However, the reactions (1) and (2) take place most effectively at an interface where three phases: the above-described solid polymer film; the wall surface of the anode; and the electrolysis liquid (water) contact with one another inside of the holes. This is because the travel distance of hydrogen ions becomes the shortest when the reactions take place in this area. On the other hand, in an area away from the above-described three-phase interface, for example, an area equal to or more than 1 mm away from the solid polymer film, the above-described reactions hardly take place. Manufacturing a thick conductive diamond plate requires time and cost for the film formation. Therefore, a conductive diamond plate with an unnecessarily large thickness is not preferable to adopt for the anode. The thickness of the anode may be preferably equal to or smaller than 1.0 mm (more preferably, equal to or smaller than 0.8 mm).

When the above-described reactions (1) and (2) take place, gas bubbles, containing ozone and oxygen, are produced at the three-phase interface. The gas bubbles grow as the electrolysis proceeds. When the size of the gas bubbles becomes equal to or larger than a predetermined size, the gas bubbles go out of the holes. Since the gas bubbles interrupt the electrode reaction while being inside of the holes, larger voltage is required in order to further proceed the electrolysis. Therefore, if effective ozone production is expected with small electric power, the electrode is preferably configured such that the produced gas bubbles can be effectively removed. The degree of easiness for the gas bubbles to be removed is closely related to the thickness of the anode. In consideration of this point and other points, the thickness of the above-described conductive diamond plate is preferably equal to or smaller than 1.0 mm (more preferably, equal to or smaller than 0.8 mm).

However, if the above-described conductive diamond plate is too thin, sufficient mechanical strength cannot be obtained. The thickness of the above-described conductive diamond plate is preferably equal to or larger than 0.2 mm (more preferably, equal to or larger than 0.4 mm). Therefore, as described above, if the thickness of the above-described conductive diamond plate is 0.2-1.0 mm (more preferably, 0.4-0.8 mm), the manufacturing cost of the electrode can be reduced without losing the effectiveness in ozone production and the mechanical strength of the electrode.

When, in this case, if the diameter of the holes, provided as above, is 0.5-3.0 mm, the following effect is furthermore caused. The degree of easiness for the gas bubbles to be removed is also closely related to the diameter of the holes. If the above-described diameter is smaller than 0.5 mm, the gas bubbles become extremely hard to be removed. On the other hand, if the diameter of the holes is too large, for example, equal to or larger than 3.0 mm, the above-described three-phase interface per unit area becomes small, and the area where the reactions (1) and (2) take place becomes relatively small. Therefore, the diameter of the above-described holes is preferably 0.5-3.0 mm (more preferably, 1.0-2.0 mm). In this case, ozone can be highly effectively produced.

Furthermore, the above-described holes may be provided more than one. In this case, if the interval between the outer peripherals of the holes is 0.2-1.5 mm, the following effect is further cause. Although the number of the holes is the larger the better from the perspective to increase the above-described three-phase interface, if the interval between the outer peripherals of the holes is too narrow, for example, smaller than 0.2 mm, sufficient strength cannot be provided to the above-described conductive diamond plate. Therefore, the above-described interval is preferably 0.2-1.5 mm (more preferably, 0.4-0.8 mm). In this case, ozone can be effectively produced while the mechanical strength of the anode is sufficiently maintained.

In case wherein holes are provided on the conductive diamond plate as described above, the inner walls of the provided holes may have a taper. In this case, the following effect is further caused. If the inner wall of a hole is provided with a taper, and the conductive diamond plate is placed such that the hole is broadened toward outside from the solid polymer film, the above-described gas bubbles can be furthermore easily removed. Therefore, in this case, the effect is caused wherein gas bubbles can be easily removed, and the effectiveness in ozone production can be increased.

The ozone generator according to the present invention which is provided with a cathode, an anode, and a solid polymer film interposed between the cathode and the anode and produces ozone by electrolyzing water, is provided, as the anode, with one of the above-described electrodes so that a three-phase interface can be formed wherein the anode, the above-described solid polymer film, and water contact one another.

Therefore, the ozone generator according to the present invention can stably produce ozone even when high voltage and large electric current are applied to the electrode, and easily produce ozone with high purity. Since the durability of the anode is high, the load of maintenance can be reduced. Moreover, since the substance constituting the anode is not dissolved, ozone-water with high purity can be directly obtained by consecutively supplying purified water.

In this case, the above-described anode may be configured smaller than the above-described solid polymer film, and configured such that a three-phase interface can be formed in the outer circumference of the anode wherein the anode, the above-described solid polymer, and water contact with one another. In case the anode is configured as above, the following effect is further caused. That is, since the above-described three-phase interface is additionally formed in the circumference of the anode, the area where the reactions (1) and (2) take place can be increased, and ozone can be furthermore effectively produced.

Moreover, the ozone generator according to the present invention, which is provided with a cathode, an anode, and a solid polymer film interposed between the cathode and the anode and produces ozone by electrolyzing water, may be provided, as the anode, with free-standing conductive diamonds, which are in a columnar shape and disposed parallel to the surface of the above-described solid polymer film, so that a three-phase interface can be formed wherein the anode, the above-described solid polymer film, and water contact one another. In this case, by using the free-standing conductive diamonds, which are in the columnar shape and disposed parallel to the surface of the solid polymer film, as the anode, the three-phase interface can be suitably increased wherein the anode, the above-described solid polymer film, and water contact with one another. Therefore, a large area can be ensured for the reactions (1) and (2), and ozone can be highly effectively produced. Additionally, the prominent characteristics of conductive diamonds, such as the stability, can be exerted in the same manner as in the respective inventions described above.

Furthermore, the ozone generator according to the present invention, which is provided with a cathode, an anode, and a solid polymer film interposed between the cathode and the anode, and produces ozone by electrolyzing water, may be provided, as the anode, with free-standing conductive diamonds, which are in a fragmentary shape and disposed on the surface of the above-described solid polymer film, so that a three-phase interface can be formed wherein the anode, the above-described solid polymer film, and water contact one another. In this case, by using the free-standing conductive diamonds, which are in the fragmentary shape and disposed on the surface of the solid polymer film, as the anode, the three-phase interface can be suitably increased wherein the anode, the above-described solid polymer film, and water contact with one another. Therefore, a large area can be ensured for the reactions (1) and (2), and ozone can be highly effectively produced. Additionally, the prominent characteristics of conductive diamonds, such as the stability, can be exerted in the same manner as in the respective inventions described above. Furthermore, since the conductive diamonds can be in a fragmentary shape, the manufacturing cost can be suitably reduced, such as by using waste of conductive diamonds remained from manufacturing of some other devices.

The ozone production method according to the present invention includes steps of providing a cathode, an anode, and a solid polymer film interposed between the cathode and the anode, and producing ozone by electrolyzing water. As the anode, one of the above-described electrodes is used. A three-phase interface can be formed wherein the anode, the above-described solid polymer film, and water contact one another.

Therefore, by the ozone production method according to the present invention, ozone can be stably produced even when high voltage and large electric current are applied to the electrode. Ozone with high purity can be easily produced. Since the durability of the anode is high as described above, the frequency to replace the anode can be reduced. Moreover, since the substance constituting the anode is not dissolved, ozone-water with high purity can be directly obtained by consecutively supplying purified water.

In this case, the method may includes a step of configuring the above-described anode smaller than the above-described solid polymer film, and configuring a three-phase interface in the outer circumference of the anode wherein the anode, the above-described solid polymer, and water contact with one another. In a case wherein the anode is configured as above, the following effect is further cause. That is, since the above-described three-phase interface is additionally formed in the circumference of the anode, the area where the reactions (1) and (2) take place can be increased, and ozone can be furthermore effectively produced.

Moreover, the ozone production method according to the present invention, in which a cathode, an anode, and a solid polymer film, interposed between the cathode and the anode, are provided for electrolyzing water, may include a step of providing, for the anode, with free-standing conductive diamonds, which are in a columnar shape and disposed parallel to the surface of the above-described solid polymer film, so that a three-phase interface can be formed wherein the anode, the above-described solid polymer film, and water contact one another. In this case, by using the free-standing conductive diamonds, which are in the columnar shape and disposed parallel to the surface of the solid polymer film, as the anode, the three-phase interface can be suitably increased wherein the anode, the above-described solid polymer film, and water contact with one another. Therefore, a large area can be ensured for the reactions (1) and (2), and ozone can be highly effectively produced. Additionally, the prominent characteristics of conductive diamonds, such as the stability, can be exerted in the same manner as in the respective inventions described above.

Furthermore, the ozone production method according to the present invention, in which a cathode, an anode, and a solid polymer film, interposed between the cathode and the anode, are provide for electrolyzing water, may include a step of providing, for the anode, with free-standing conductive diamonds, which are in a fragmentary shape and disposed on the surface of the above-described solid polymer film, so that a three-phase interface can be formed wherein the anode, the above-described solid polymer film, and water contact one another. In this case, by using the free-standing conductive diamonds, which are in the fragmentary shape and disposed on the surface of the solid polymer film, as the anode, the three-phase interface can be suitably increased wherein the anode, the above-described solid polymer film, and water contact with one another. Therefore, a large area can be ensured for the reactions (1) and (2), and ozone can be highly effectively produced. Additionally, the prominent characteristics of conductive diamonds, such as the stability, can be exerted in the same manner as in the respective inventions described above. Furthermore, since the conductive diamonds can be in a fragmentary shape, the manufacturing cost can be suitably reduced, such as by using waste of conductive diamonds remained from manufacturing of some other devices.

DESCRIPTION OF NUMERALS

Figure 1:
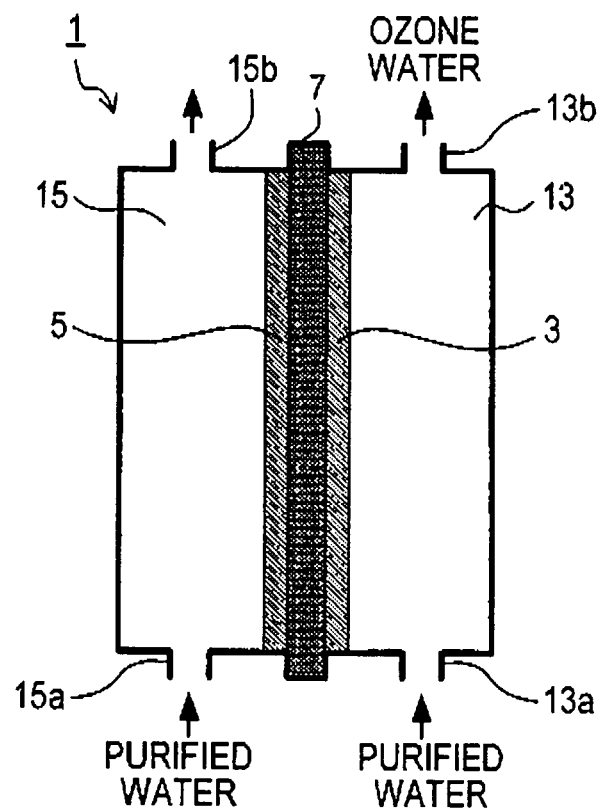
FIG. 1 is a diagram showing a structure of an electrolysis cell according to a conventional example and an embodiment of the present invention.

1 ... electrolysis cell
3 ... anode
3a ... hole
5 ... cathode
7 ... solid polymer film
13 ... anode chamber
15 ... cathode chamber

BEST MODE FOR CARRYING OUT THE INVENTION

Preferred embodiments of the present invention will now be described with reference to the accompanying drawings.

An electrolysis cell 1, which is an ozone generator according to the present embodiment, is configured in the same manner as the electrolysis cell 1 of the above-described conventional example except for an anode 3 to be described later. That is, as shown in FIG. 1, the anode 3 and a cathode 5 are disposed so as to interpose a solid polymer film 7 (Product Name "Nafion": made by DuPont). The anode 3 and the cathode 5 are attached and secured to the opposing surfaces of the solid polymer film 7. An anode chamber 13 and a cathode chamber 15 are respectively formed on the surfaces of the anode 3 and the cathode 5. The anode chamber 13 and the cathode chamber 15 respectively include supply ports 13a and 15a, and outlet ports 13b and 15b.

Figure 2:
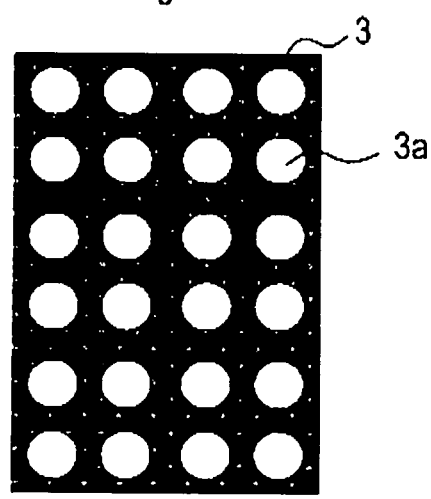
FIG. 2 is a diagram showing a structure of an anode according to the present embodiment.

As shown in FIG. 2, the anode 3 is a free-standing conductive diamond plate, which is formed in a rectangular plate shape with a thickness of 0.8 mm by microwave plasma assisted CVD. The anode 3 is provided with holes 3a with a diameter of 1 mm. The center-distance between each of the holes 3a is 2 mm (that is, the distance between the outer peripherals of the holes 3a is 1 mm). The holes 3a are provided by laser. For the cathode 5, a platinum mesh electrode is used.

In the electrolysis cell 1 configured as above, when purified water (tap water can be also used) is supplied through respective supply inlets 13a and 15a while direct electric current is applied between the anode 3 and the cathode 5, ozone-water is discharged from the outlet port 13b of the anode chamber 13. When a direct-current electrolysis at 10A was performed wherein purified water was supplied respectively into the anode chamber 13 and the cathode chamber 15 at the flow rate of 3.0 L/min., from the outlet port 13b of the anode chamber 13, water containing ozone of 2.8 ppm was obtained. A continuous running was conducted for 1000 hours so as to monitor the change in the anode 3. As a result, no change was found in raman spectrum, the image of the surface observed by an electronic microscope, and the weight of the electrode before and after the test.

As described above, the electrolysis cell 1 according to the present embodiment can stably produce ozone without causing exfoliation on the conductive diamond of the anode 3, even high voltage and large electric current are applied between the anode 3 and the cathode 5. Therefore, ozone with high purity can be easily produced. In addition, since the anode 3 has a high durability as described above, the load of maintenance for the device can be reduced. Furthermore, since the substance constituting the anode 3 is not dissolved, ozone-water with high purity can be obtained.

It is to be noted that the present invention is not limited to the above-described embodiment. Variations and modifications are possible without deriving from the scope of the invention. For example, in the same manner as the anode 3, the cathode 5 may be configured with a free-standing conductive diamond plate having a porous structure. Moreover, the conductive diamond plate constituting the anode 3 may be manufactured by a method other than the microwave plasma assisted CVD.

Furthermore, the holes 3a can be formed in some other shape. The holes 3a can be formed in a slit-like shape. Alternatively, large holes 3a can be provided so that the anode 3 becomes mesh. Providing the holes 3a may be done by electrical discharging. The conductive diamond plate can be made porous in the manufacturing process thereof. Still furthermore, the electrode according to the present invention can be used, not only for producing ozone, but also as an electrode for general electrolytic processes or electro-osmotic processes.

However, in case of producing ozone by using the above-described anode 3, due to the following reason, the thickness of the anode 3 is preferably 0.2-1.0 mm (more preferably 0.4-0.8 mm). That is, when direct electric current is applied between the anode 3 and the cathode 5 of the electrolysis cell 1, on the inner-wall surfaces of the holes 3a, oxygen evolution reaction or ozone evolution reaction takes place due to oxidative decomposition of water.

$$2H_2O \rightarrow O_2 + 4H^+ + 4e^- \quad (1)$$

$$3H_2O \rightarrow O_3 + 6H^+ + 6e^- \quad (2)$$

Hydrogen ions produced through the reaction processes (1) and (2) permeate the solid polymer film 7 which has ion-permeable property, and reach the cathode 5. On the cathode 5, reduction reaction occurs wherein the hydrogen ions, which permeate through the film 7, receive electrons.

$$2H^+ + 2e^- \rightarrow H_2 \quad (3)$$

Figure 3:
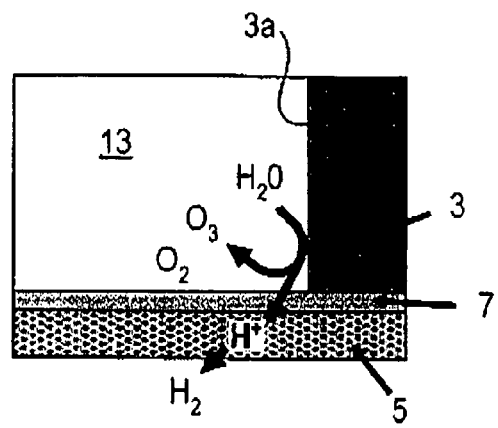
FIG. 3 is an explanatory view showing that a reaction at the anode takes place in the vicinity of a three-phase interface.

Produced Hydrogen is dispersed into the cathode chamber 15. However, as shown in FIG. 3, the reactions (1) and (2) take place most effectively at the interface where three phases: the solid polymer film 7 inside of the holes 3a; the inner-wall surfaces of the holes 3a; and the electrolysis liquid (water) inside of the anode chamber 13 contact with one another. This is because the travel distance of hydrogen ions becomes the shortest when the reactions take place in this area. Manufacturing a thick conductive diamond plate requires time and cost for the film formation. Therefore, a conductive diamond plate with an unnecessarily large thickness is not preferable to adopt as the anode 3. The thickness of the anode 3 is preferably equal to or smaller than 1.0 mm (more preferably, equal to or smaller than 0.8 mm).

Figure 4A:
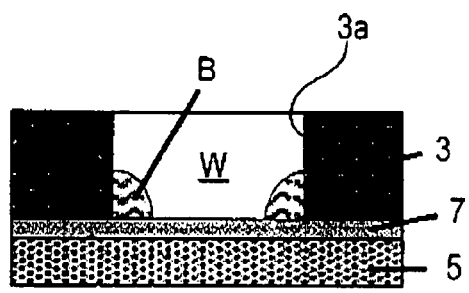
FIGS. 4A-4C are explanatory views showing growth of an air bubble in a hole of the anode.
Figure 4B:
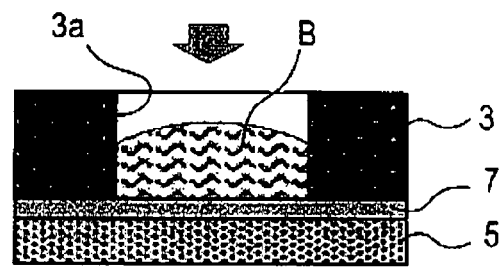
Figure 4C:
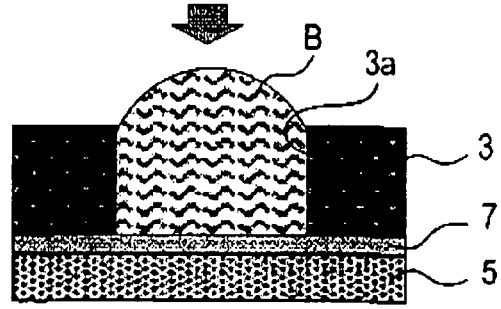

When the above-described reactions (1) and (2) take place, an gas bubbles B containing ozone and oxygen are produced at the above-described three-phase interface. The gas bubbles B consequently grow as shown in FIGS. 4A-4C as the electrolysis proceeds. When the size of the gas bubbles B becomes equal to or larger than a predetermined size, due to the buoyancy of the gas bubbles B, the gas bubbles B go out of the holes 3a. Since the gas bubbles B interrupt the electrode reaction while being inside of the holes 3a, larger electric voltage is necessary in order to further proceed the electrolysis. Therefore, if effective ozone production is expected with small electric power, the electrode is preferably configured such that the produced gas bubbles B can be effectively removed. The degree of easiness for the gas bubbles B to be removed is closely related to the thickness of the anode 3. In consideration of this point and other points, the thickness of the anode 3 is preferably equal to or smaller than 1.0 mm (more preferably, equal to or smaller than 0.8 mm). However, if the above-described anode 3 is too thin, sufficient mechanical strength cannot be obtained. Therefore, the thickness of the anode 3 is preferably equal to or larger than 0.2 mm (more preferably, equal to or larger than 0.4 mm).

The degree of easiness for the gas bubbles B to be removed is also closely related to the diameter of the holes 3a. If the above-described diameter is smaller than 0.5 mm, the gas bubbles B become extremely hard to be removed. On the other hand, if the diameter of the holes 3a is too large, for example, equal to or larger than 3.0 mm, the volume of the above-described three-phase interface per unit area becomes small, and the area where the reactions (1) and (2) take place becomes relatively small. Therefore, the diameter of the holes 3a is preferably 0.5-3.0 mm (more preferably, 1.0-2.0 mm). In this case, ozone can be highly effectively produced.

Furthermore, in case a plurality of holes 3a are provided as described in the above embodiment, the interval between the outer peripherals of the holes 3a is preferably 0.2-1.5 mm. From the perspective to increase the above-described three-phase interface, the number of the holes 3a is the larger the better. However, if the interval between the outer peripherals of the hoes 3a is too narrow, for example, smaller than 0.2 mm, sufficient strength cannot be provided to the anode 3. Therefore, the above-described interval is preferably 0.2-1.5 mm (more preferably, 0.4-0.8 mm). In this case, ozone can be effectively produced while the mechanical strength of the anode 3 is sufficiently maintained.

Figure 5:
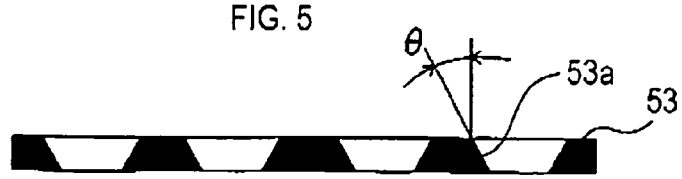
FIG. 5 is a diagram showing an example wherein taper machining is provided to the hole of the anode.

In order for the gas bubbles B to be easily removed, providing taper machining on the inner-wall surfaces of holes 53a is effective as shown with an anode 53 in FIG. 5. As a result, the holes 53a become broadened from the side of the solid polymer film 7 toward outside (to be referred to as a funnel-shape, and the inverted shape is to be referred to as an inverted-funnel-shape).

Figure 6A:
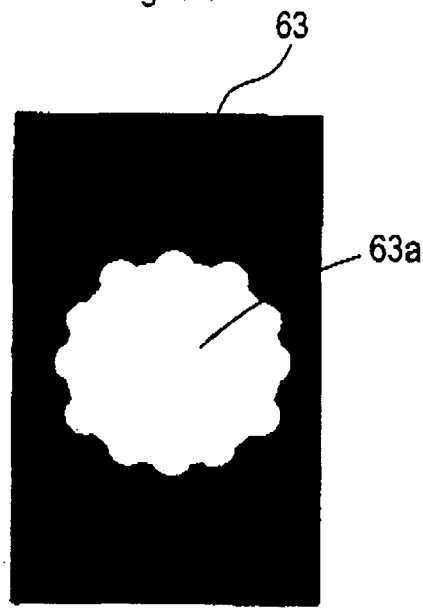
FIGS. 6A and 6B are diagrams showing variations wherein the shape of the hole of the anode is changed.
Figure 6B:
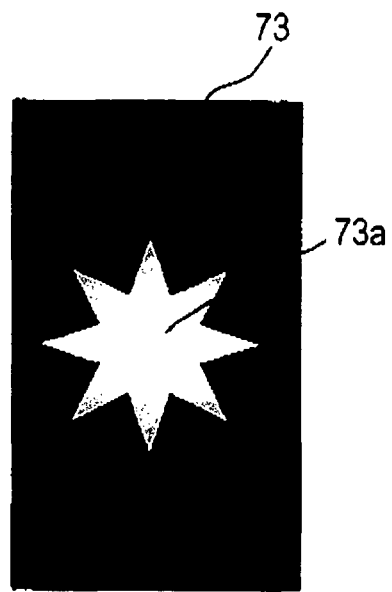

The three-phase interface can be also effectively increased, as shown with the partially enlarged anode 63 in FIG. 6A, by configuring the peripherals of the holes 63a corrugated, or as shown with a partially enlarged anode 73 in FIG. 6B, by forming holes 73a into a star-shape.

Figure 7A:
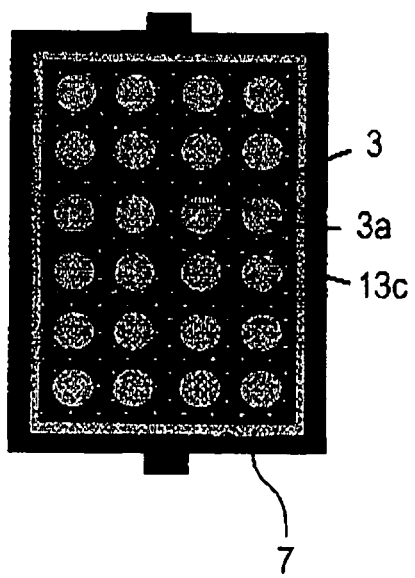
FIGS. 7A and 7B are diagrams showing examples wherein a peripheral of the anode is separated from an outer peripheral portion of an anode chamber.
Figure 7B:
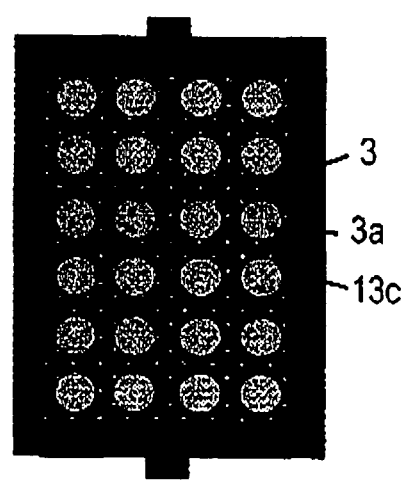

Furthermore, the three-phase interface can be also effectively increased, as shown in FIG. 7A, by configuring the anode 3 smaller than the solid polymer film 7, separating the peripheral of the anode 3 from the outer peripheral portion 13c of the anode chamber 13, and thereby forming the three-phase interface in the peripheral of the anode 3. In other words, as shown in FIG. 7B, the sizes of the solid polymer film 7 and the anode 3, disposed inside of the outer peripheral portion 13c, are normally the same, or the peripheral of the anode 3 is sealed by a sealing member and the state of the solid polymer film 7 and the anode 3 is substantially in the same manner as in FIG. 7B. By forming the three-phase interface around the anode 3., the effectiveness in producing ozone can be suitably improved.

Figure 8:
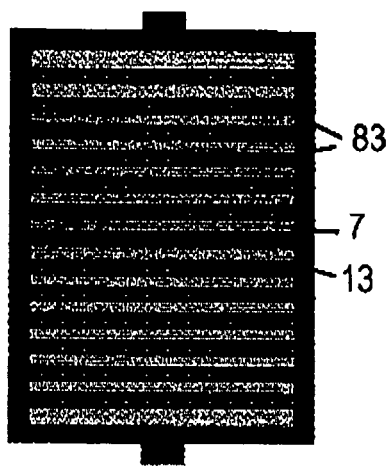
FIG. 8 is a diagram showing a variation wherein a columnar diamonds are used as the anode.
Figure 9:
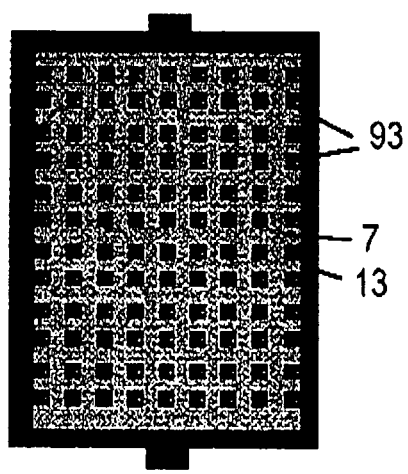
FIG. 9 is a diagram showing a variation wherein fragmentary diamonds are used as the anode.

Still furthermore, in order to increase the three-phase interface, as shown in FIG. 8, a number of columnar (in this case, square columnar) anodes 83, made of free-standing conductive diamonds, may be disposed in parallel to the surface of the solid polymer film 7. Alternatively, as shown in FIG. 9, a number of fragmentary (in this case, cubical) anodes 93, made of free-standing conductive diamonds, may be disposed on the surface of the solid polymer film 7. Also in these cases, the three-phase interface can be increased, and the effectiveness in producing ozone can be improved.

EXAMPLE OF EXPERIMENT

Now, an example of experiment, conducted to verify the effect of each of the respective above-described embodiments, will be described below. Diamond electrodes having parameters shown below were made with free standing diamond plates in a rectangular shape having a thickness of 0.8 mm and a size of 15 mm×50 mm, and synthesized by microwave plasma assisted CVD. Holes were provided on the diamond plates by laser. For disposition of the holes, four types of disposition, such as the ones shown in FIGS. 10A, 10B, 10C, and 10D, were adopted.

The electrodes were used as the anode 3. The anode 3 and the cathode 5 were disposed so as to interpose the solid polymer film 7 (Product Name "Nafion" made by DuPont) as shown in FIG. 1. For the cathode 5, mesh platinum was used.

While supplying water from respective supply ports 13a and 15a, direct electric current was applied between the anode 3 and the cathode 5. The amount of ozone produced per unit time became as below. Water was supplied 3.2 L/min. into the anode chamber 13. The electrolysis was performed with direct current at 10A.

TABLE 1

| Hole disposition | Hole diameter (mm) | Number of holes | Circumference in total (cm) | Ozone production amount (mg/min) |
|---|---|---|---|---|
| (A) | 1.5 | 144 | 80.824 | 5-5.7 |
| (B) | 1.5 | 168 | 92.128 | 5.6-6.5 |
| (C) | 1.5 | 196 | 105.316 | 7-8 |
| (D) | 2.0 | 99 | 75.172 | 6.8-7.6 |

As shown in Table 1, the effectiveness of ozone production appears to be improved as the sum of the lengths of circumferences of respective holes (circumference in total) becomes longer. This is attributed to the fact that the above-described three-phase interface is increased. In comparison of (A) and (D), although the circumferences in total are approximately equivalent, the effectiveness in ozone production is remarkably better in (D). This seems to be caused because gas bubbles are more easily removed from holes when the diameter of the holes is larger.

Figure 10A:
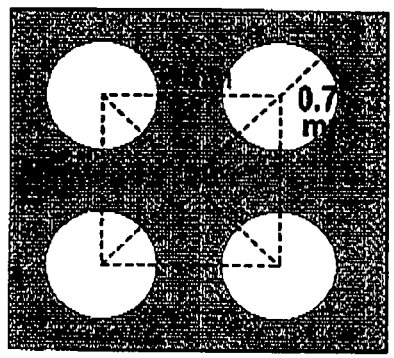
FIGS. 10A-10D are diagrams showing dispositions of holes on the anodes with which experiments are performed.
Figure 10B:
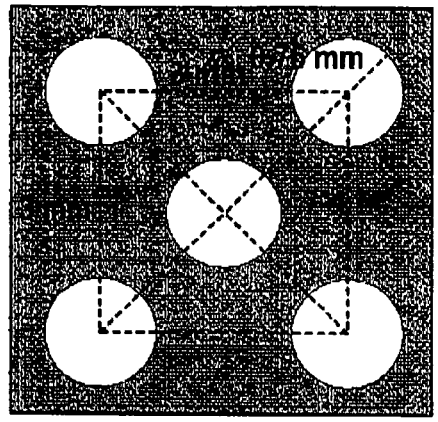
Figure 10C:
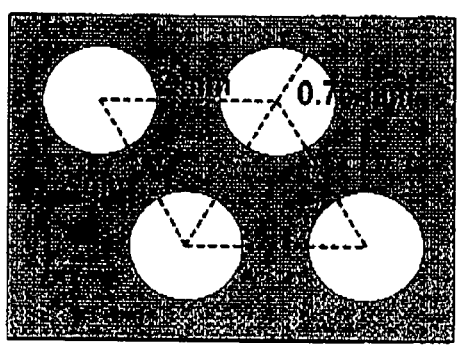
Figure 10D:
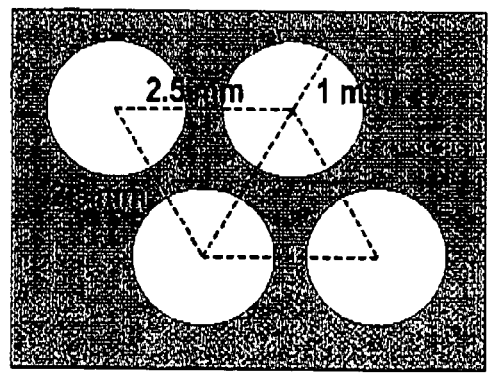

Subsequently, a comparison was made between the following types of the anode 3, both of which have the same hole disposition as in FIG. 10B. A former type of anode 3 is sealed on the circumference thereof in the same manner as in the state shown in FIG. 7B. A latter type of anode 3 is not sealed, but has a gap of approximately 1 mm therearound. The result of the comparison is shown in Table 2. As shown in Table 2, by separating the circumference of the anode 3 from the outer peripheral portion 13c of the anode chamber 13, the three-phase interface was formed in the peripheral of the anode 3, and the effectiveness in ozone production appears to be improved.

TABLE 2

| Applied current value | Without sealing | With sealing | Production rate |
|---|---|---|---|
| 0.5 A | 0.49 mg/min | 0.29 mg/min | 0.60 |
| 1 A | 1.16 mg/min | 0.89 mg/min | 0.77 |
| 1.5 A | 1.75 mg/min | 1.54 mg/min | 0.88 |

Furthermore, the following experiment was conducted so as to verify the effect of taper machining. Diamond electrodes, which were to be the anode 3, were made with free-standing diamond plates in a rectangular shape having a thickness of 0.4 mm and a size of 15 mm×50 mm, and synthesized by microwave plasma assisted CVD. Holes were provided on the diamond plates by laser in the same disposition as shown in FIG. 10B. Respective holes were provided with taper angle θ (see FIG. 5) by taper machining such that the angle θ became 3-4°. A comparison was made in the amount of ozone produced per unit time between the diamond plate wherein taper machining was provided in the funnel-shape, and the diamond plate wherein taper machining was provided in the inverted-funnel-shape. The result is shown in Table 3. In this experiment, water was supplied 1.6 L/min. into the anode chamber 13.

TABLE 3

| Applied current value | Funnel-shape | Inverted-funnel-shape |
|---|---|---|
| 5 A | 1.84 mg/min | 1.6 mg/min |
| 10 A | 5.75 mg/min | 5.08 mg/min |

As shown in Table 3, gas bubbles could be effectively removed from holes in the funnel-shaped disposition. Therefore, it was found out that the effectiveness in ozone production was improved in that hole disposition. In the above-described experiment, it was found out that the voltage applied to the electrolysis cell with the funnel-shape holes became approximately 1V smaller than the electrolysis cell with the inverted-funnel-shape holes. This also attributed the fact that gas bubbles could be effectively removed from the funnel-shape holes.

As described above, it is verified that ozone can be highly effectively produced in each of the above-described embodiments, and the effectiveness in ozone production can be further improved by increasing the three-phase interface and making the holes into the funnel-shape.

Industrial Applicability

According to the present invention, an electrode can be provided wherein deterioration or exfoliation does not have to be concerned, and electrolysis, in which high voltage and large electric current are applied, can be stably performed. Additionally an ozone generator and an ozone production method, in which such electrode is used, can be also provided. Therefore, ozone for disinfection purpose can be effectively produced.

What is claimed is:

1. An electrode made of a free-standing conductive diamond plate having one of porous or mesh structures wherein the free-standing conductive diamond plate has at least one hole provided by one of laser processing and electrical discharging; wherein said hole extends from one side of the diamond plate through to the other side of the diamond plate; wherein an inner wall of the hole comprises a taper.

2. The electrode as set forth in claim 1 wherein the conductive diamond plate is manufactured by microwave plasma assisted CVD.

3. The electrode as set forth in claim 1 wherein a thickness of the conductive diamond plate is between 0.2 and 1.0 mm.

4. The electrode as set forth in claim 3 wherein a diameter of the hole provided on the diamond plate is between 0.5 and 3.0 mm.

5. The electrode as set forth in claim 4 wherein a plurality of the holes is provided on the diamond plate such that an interval between an outer peripheral of each hole is between 0.2 and 1.5 mm.

6. The electrode as set forth in claim 3 wherein a plurality of the holes is provided on the diamond plate such that an interval between an outer peripheral of each hole is between 0.2 and 1.5 mm.

7. An ozone generator for electrolysis of water comprising:
a cathode;
an anode; and
a solid polymer film interposed between the cathode and the anode,
wherein the anode is made of the electrode, set forth in claim 1, and
configured such that a three-phase interface can be formed in which the anode, the solid polymer film, and water contact with one another.

8. The ozone generator as set forth in claim 7 wherein the anode is configured smaller than the solid polymer film, and configured such that the three-phase interface can be formed, in which the anode, the solid polymer film, and water contact with one another, in an outer peripheral of the anode.

9. A method for producing ozone comprising steps of: providing a cathode, an anode, and a solid polymer film interposed between the cathode and the anode; and
electrolyzing water
wherein the electrode, set forth in claim 1, is provided as the anode, and
a three-phase interface is formed in which the anode, the solid polymer film, and water contact with one another.

10. The method for producing ozone as set forth in claim 9 comprising steps of:
configuring the anode smaller than the solid polymer film; and
forming the three-phase interface in an outer peripheral of the anode wherein the anode, the solid polymer film, and water contact with one another.

11. An ozone generator for electrolysis of water comprising:
a cathode;
an anode; and
a solid polymer film interposed between the cathode and the anode,
wherein the anode is made of the electrode, set forth in claim 1, and configured such that a three-phase interface can be formed in which the anode, the solid polymer film, and water contact with one another.

12. A method for producing ozone comprising steps of:
providing a cathode, an anode, and a solid polymer film interposed between the cathode and the anode; and
electrolyzing water
wherein the electrode, set forth in claim 1, is provided as the anode, and a three-phase
interface is formed in which the anode, the solid polymer film, and water contact with one another.

13. An ozone generator for electrolysis of water comprising: a cathode;
an anode; and
a solid polymer film interposed between the cathode and the anode,
wherein the anode is made of a plurality of free-standing conductive diamond, having a columnar shape and disposed parallel to a surface of the solid polymer film, and configured such that a three-phase interface can be formed in which the anode, the solid polymer film, and water contact with one another;
wherein the anode has at least one hole provided by one of laser processing and electrical discharging; wherein said hole extends from one side of the anode through to the other side of the anode; wherein an inner wall of the hole comprises a taper.

14. An ozone generator for electrolysis of water comprising: a cathode;
an anode; and
a solid polymer film interposed between the cathode and the anode,
wherein the anode is made of a plurality of free-standing conductive diamond, having a fragmentary shape and disposed on a surface of the solid polymer film, and configured such that a three-phase interface can be formed in which the anode, the solid polymer film, and water contact with one another;
wherein the anode has at least one hole provided by one of laser processing and electrical discharging; wherein said hole extends from one side of the anode through to the other side of the anode; wherein an inner wall of the hole comprises a taper.

15. A method for producing ozone comprising steps of:
providing a cathode, an anode, and a solid polymer film interposed between the cathode and the anode; and
electrolyzing water
wherein a plurality of free-standing conductive diamond is provided as the anode, the plurality of conductive diamonds having a columnar shape and disposed parallel to a surface of the solid polymer film, and a three-phase interface is formed in which the anode, the solid polymer film, and water contact with one another;
wherein the anode has at least one hole provided by one of laser processing and electrical discharging; wherein said hole extends from one side of the anode through to the other side of the anode; wherein an inner wall of the hole comprises a taper.

16. A method for producing ozone comprising steps of:
providing a cathode, an anode, and a solid polymer film interposed between the cathode and the anode; and
electrolyzing water;
wherein the anode has at least one hole provided by one of laser processing and electrical discharging; wherein said hole extends from one side of the anode through to the other side of the anode; wherein an inner wall of the hole comprises a taper.

* * * * *